US010716392B2

(12) United States Patent
Brensinger

(10) Patent No.: US 10,716,392 B2
(45) Date of Patent: *Jul. 21, 2020

(54) TABLE TOP AND SKIRT WITH FOLDABLE LEGS

(71) Applicant: NEMO EQUIPMENT, INC., Dover, NH (US)

(72) Inventor: Camon Brensinger, Stratham, NH (US)

(73) Assignee: NEMO Equipment, Inc., Dover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,743

(22) Filed: Aug. 20, 2019

(65) Prior Publication Data

US 2019/0374021 A1 Dec. 12, 2019

Related U.S. Application Data

(63) Continuation of application No. 15/879,007, filed on Jan. 24, 2018, now Pat. No. 10,390,609.
(Continued)

(51) Int. Cl.
| | |
|---|---|
| *A47B 3/12* | (2006.01) |
| *A47B 3/083* | (2006.01) |
| *A47B 13/08* | (2006.01) |
| *A47B 3/08* | (2006.01) |
| *A47B 3/06* | (2006.01) |
| *F16B 12/44* | (2006.01) |
| *A47B 37/04* | (2006.01) |

(Continued)

(52) U.S. Cl.
CPC ............... *A47B 3/12* (2013.01); *A47B 3/002* (2013.01); *A47B 3/06* (2013.01); *A47B 3/083* (2013.01); *A47B 3/0803* (2013.01); *A47B 13/003* (2013.01); *A47B 13/088* (2013.01); *A47B 37/04* (2013.01); *F16B 12/44* (2013.01); *A47B 2003/0806* (2013.01); *A47B 2200/001* (2013.01); *A47B 2220/0072* (2013.01); *F16B 2012/446* (2013.01)

(58) Field of Classification Search
CPC .......... A47C 5/005; A47C 7/70; A47B 3/083; A47B 3/06; A47B 3/0803; A47B 3/12; A47B 2003/0835; A47B 2220/0083; A47B 13/003; A47B 37/04; A47B 2003/0806; F16B 12/44; F16B 2012/446
USPC ..................... 108/115, 90, 66, 166
See application file for complete search history.

(56) References Cited

U.S. PATENT DOCUMENTS 900,552 A * 10/1908 Kade
2,184,976 A * 12/1939 McFall .................... A47B 1/04
108/63

(Continued)

FOREIGN PATENT DOCUMENTS

EP 257370 * 3/1998

*Primary Examiner* — Janet M Wilkens

(57) ABSTRACT

A foldable table and table legs comprises a tabletop comprising a plurality of tabletop sections each of which are interconnected by a hinge mechanism allowing the tabletop fold into a small, compact package. Detachable and foldable legs are configured for coupling to a table skirt comprising four segments which fold down from a storage pocket on the underside of the tabletop. The foldable legs interconnect with the table skirt once it is folded down from its storage position. The tabletop and foldable legs may all be folded into a compact, portable and packable configuration.

7 Claims, 16 Drawing Sheets

Related U.S. Application Data

(60) Provisional application No. 62/449,818, filed on Jan. 24, 2017.

(51) Int. Cl.
    *A47B 13/00*     (2006.01)
    *A47B 3/00*     (2006.01)

(56) References Cited

U.S. PATENT DOCUMENTS

| | | | | |
|---|---|---|---|---|
| 2,654,647 A | * | 10/1953 | Murray | A47B 3/083 108/173 |
| 3,303,797 A | * | 2/1967 | Mueller | A47B 3/083 108/63 |
| 3,490,394 A | * | 1/1970 | Crandall | A47B 3/00 108/115 |
| 3,592,143 A | * | 7/1971 | Krone | A47B 3/00 108/115 |
| 4,860,667 A | * | 8/1989 | Cardenas | A47B 3/00 108/115 |
| 4,928,350 A | * | 5/1990 | Morgan | E05D 3/12 16/297 |
| 5,088,419 A | * | 2/1992 | Hartwell | A47B 3/083 108/166 |
| 5,382,081 A | * | 1/1995 | Henry | A47C 5/005 206/815 |
| D613,525 S | * | 4/2010 | Henschel | D6/690 |
| 2003/0159628 A1 | * | 8/2003 | Salzer | A47C 7/70 108/115 |
| 2007/0256610 A1 | * | 11/2007 | Robinson | A47B 3/083 108/115 |
| 2010/0139531 A1 | * | 6/2010 | Valeriote | A47B 13/003 108/90 |

* cited by examiner

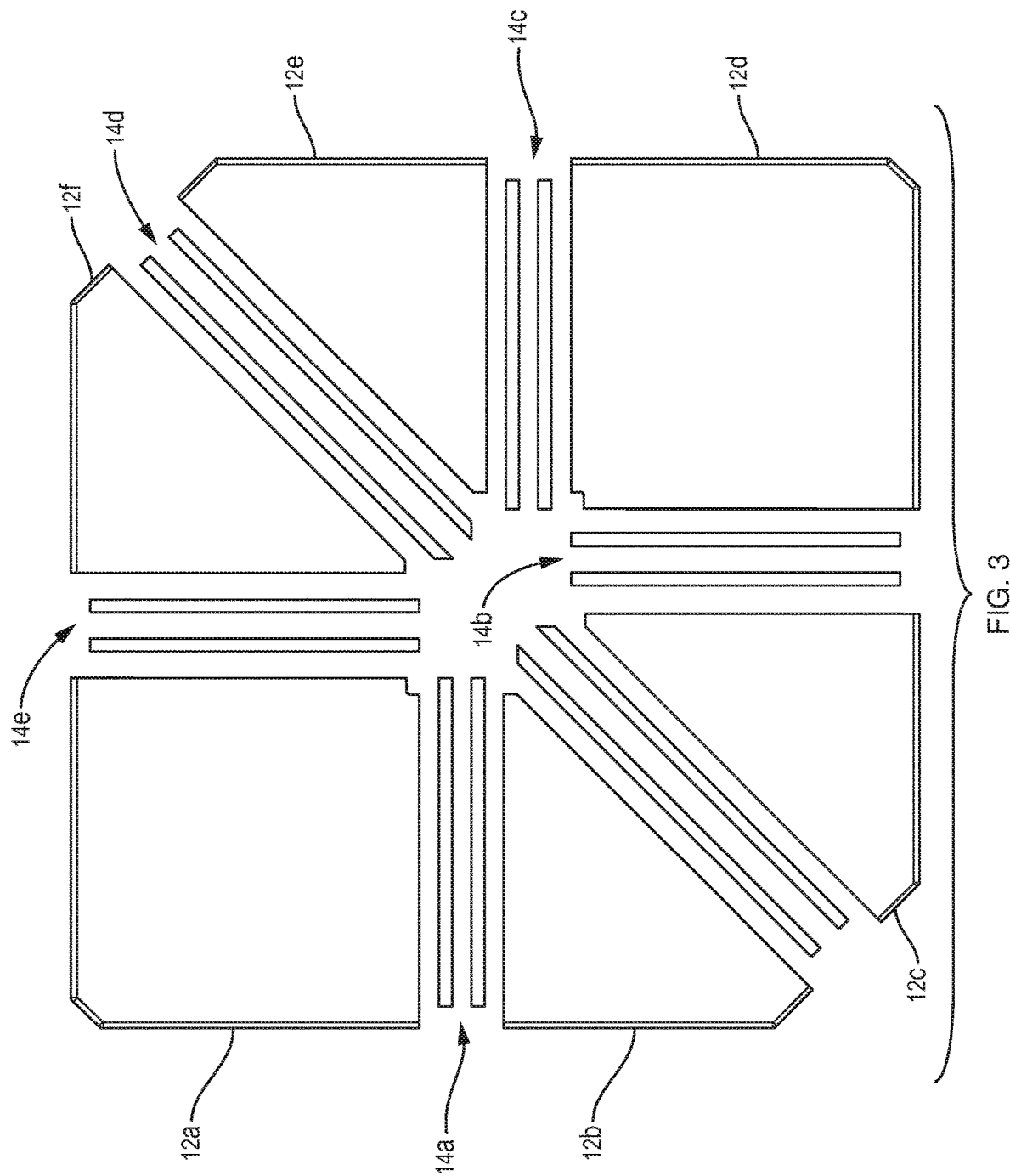

TABLE TOP AND SKIRT WITH FOLDABLE LEGS

CROSS-REFERENCE TO RELATED APPLICATIONS

This application is a continuation of U.S. patent application Ser. No. 15/879,007 filed Jan. 24, 2018 for "TABLE TOP AND SKIRT WITH FOLDABLE LEGS" which in turn claims priority from U.S. Provisional Patent Application No. 62/449,818 filed on Jan. 24, 2017 and titled "OUTDOOR EQUIPMENT 2016", both of which are incorporated fully herein by reference.

TECHNICAL FIELD

The present invention relates to outdoor equipment, outdoor furniture, outdoor camping equipment and parts and fittings therefore, and more particularly, relates to a collapsible/foldable table including a unique foldable tabletop and foldable legs as well as a method for attaching the foldable legs to a table skirt. Also included are foldable hinges useful for foldably connecting together various items and objects.

BACKGROUND INFORMATION

A large portion of the population enjoy camping and other outdoor activities. When engaged in these activities, however, many people enjoy some of the comforts of home. This includes a table or other surface which can be used to prepare food, serve food or place various objects including Cook stoves and the like for use during outdoor activities.

Although individuals engaged in the activities enjoy such comforts of home, weight, space and collapsibility is still an important feature. If the table is not able to be folded and stored in a small area and if it is too heavy, its usefulness will be lost to campers and outdoor enthusiasts. Accordingly, what is needed is a highly collapsible/foldable lightweight table which can be folded for purposes of packing it to the outdoor area but which can be folded to form a multipurpose, useful table.

SUMMARY

The present invention describes a foldable tabletop and tabletop supporting legs. The foldable tabletop and tabletop supporting legs, in accordance with one embodiment, include a tabletop comprising a plurality of segments, wherein each of the plurality of segments coupled is to an adjacent two of the plurality of segments by a hinge mechanism. The hinge mechanism is configured for allowing one or more of the plurality of segments to fold along the hinge mechanism onto an adjacent one of the plurality of segments. The tabletop comprises a top surface and a bottom surface.

The foldable tabletop and tabletop supporting legs further include a tabletop skirt comprising four tabletop skirt sections and configured for folding downward from a storage position either in a recess located in the bottom surface of the tabletop of simply folded against the bottom surface of the tabletop. The four tabletop skirt sections form four tabletop skirt corners when in the folded downward position.

The foldable tabletop and tabletop supporting legs further include four table legs, wherein each of the four table legs include a vertical fold mechanism and a horizontal fold mechanism. The horizontal fold mechanism is configured for allowing the four table legs to fold in a horizontal direction reducing a non-folded length of each of the four table legs. The vertical fold mechanism is configured for allowing the four table legs to fold in a vertical direction reducing a non-folded width of the table legs.

In accordance with one embodiment, a plurality of corners of the tabletop include a first pair of diagonally opposite corners and a second pair of diagonally opposite corners, wherein the first pair of diagonally opposite corners and the second pair of diagonally opposite corners are chamfered.

In accordance with one embodiment, the first pair of diagonally opposite corners have a smaller chamfer relative to the second pair of diagonally opposite corners.

In accordance with one embodiment, the second pair of diagonally opposite corners include a finger cut out region, wherein the finger cut out region provides a carrying location for the table.

In accordance with one embodiment, a top portion of the 4 table legs at least one slot for interconnecting with the downward folded tabletop skirt.

In accordance with one embodiment, the 4 table legs include a foldable piece having a live hinge for allowing the foldable piece to fold back against a leg portion of the four table legs and against a corner formed by the table skirt.

In accordance with one embodiment, the four table legs include an opening for allowing a user to push against the foldable piece to release the foldable leg from interconnection with the table skirt.

BRIEF DESCRIPTION OF THE DRAWINGS

These and other features and advantages of the present invention will be better understood by reading the following detailed description, taken together with the drawings wherein:

FIG. 3 is a top exploded view of the table showing the symmetrical hinges connecting each of the pieces;

DETAILED DESCRIPTION OF THE PREFERRED EMBODIMENTS

Figure 1:
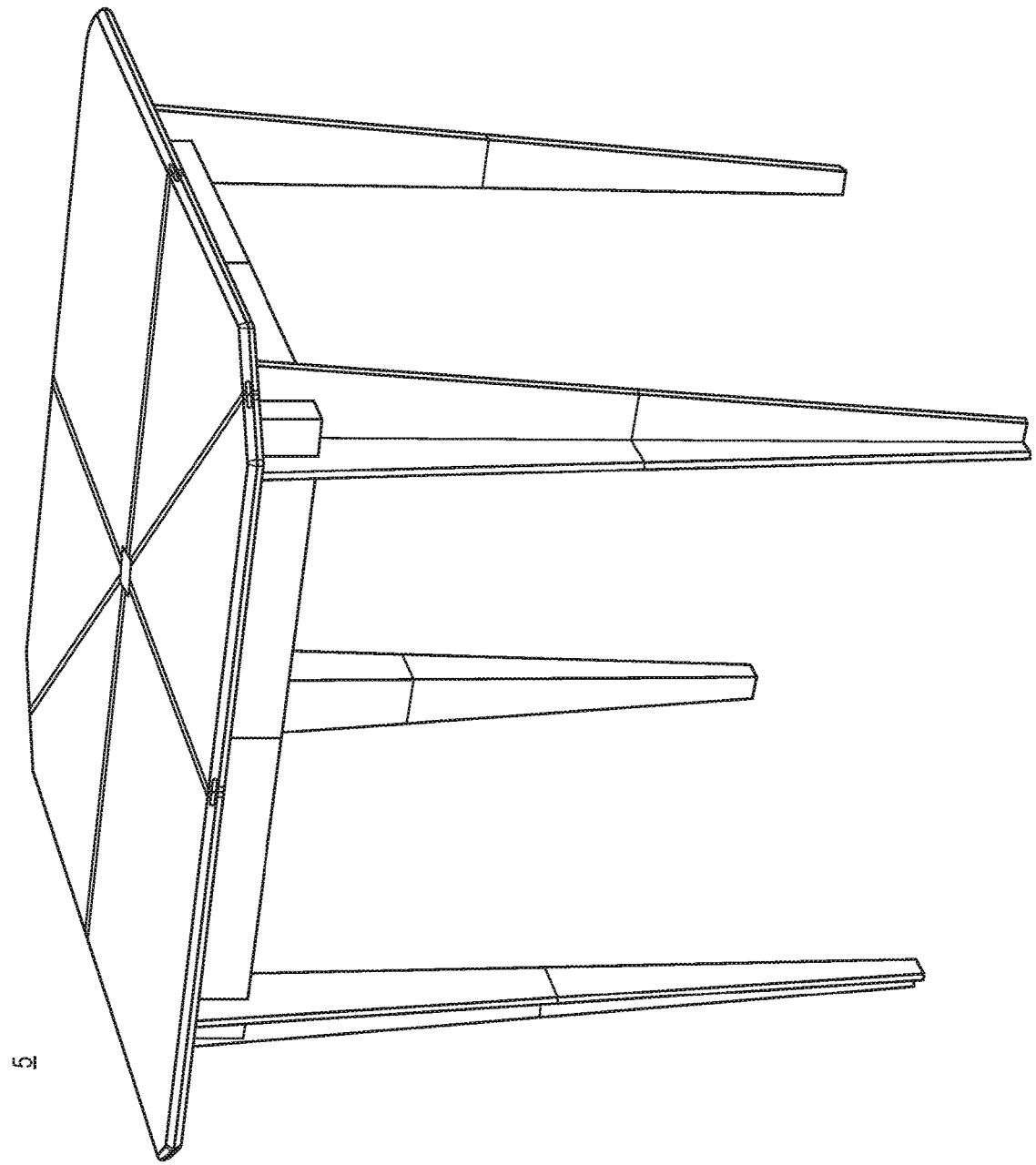
FIG. 1 is a perspective view of a foldable table according to one embodiment of the present invention.
Figure 2:
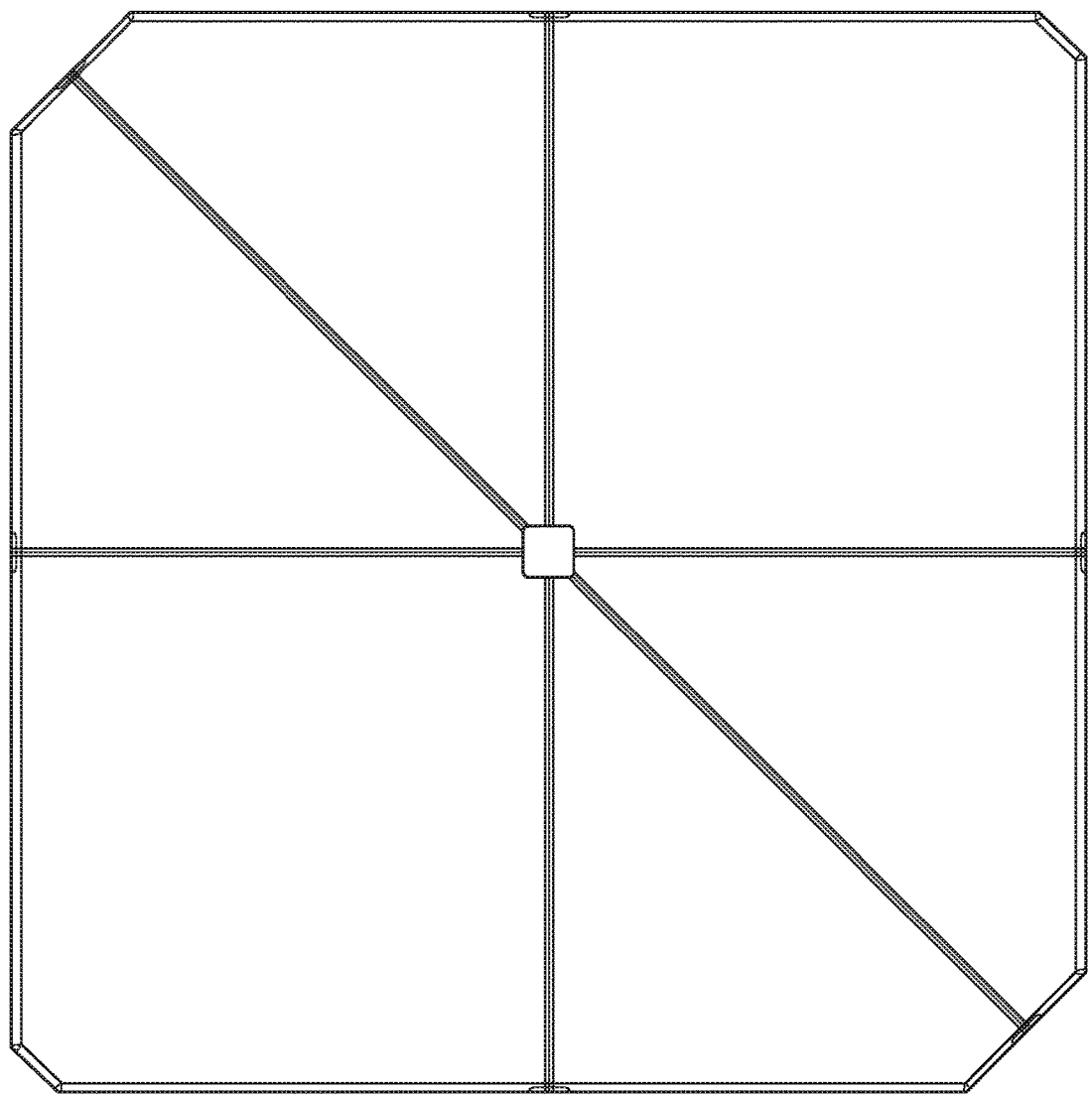
FIG. 2 is a top view of the table.

FIG. 1 illustrates a foldable table 5 according to one aspect of the present invention. This feature of the invention includes a foldable tabletop 10, FIG. 2 comprising a number of segments or portions 12a-12f FIG. 3, each of which are connected together by a hinge 14a-14e. Every part is symmetrical which allows the table to fold unto itself, origami style, as illustrated in FIGS. 4A-4D. The tabletop 10 is preferably made of a lightweight material such as bamboo, plastic, a composite material or the like which aids in making the foldable table of the invention lightweight, portable and easy to transport to and from a desired location of use.

Figure 4B:
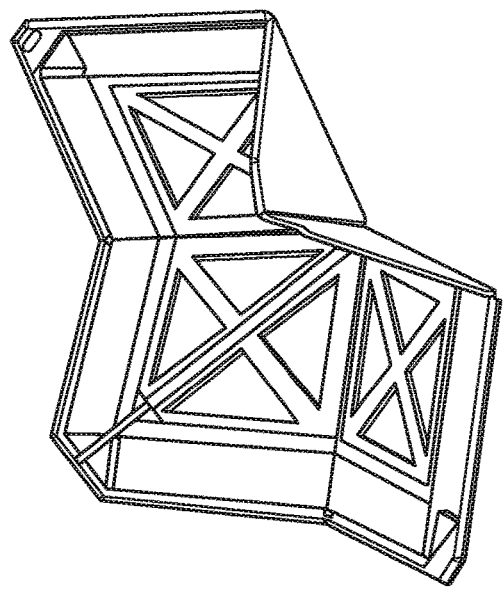
FIGS. 4A-4D illustrate how the table folds.
Figure 4D:
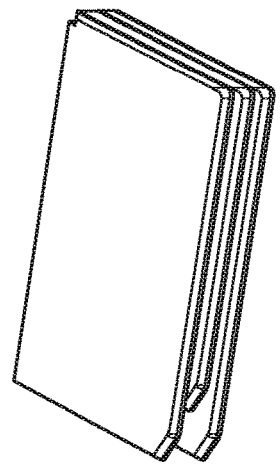
Figure 4A:
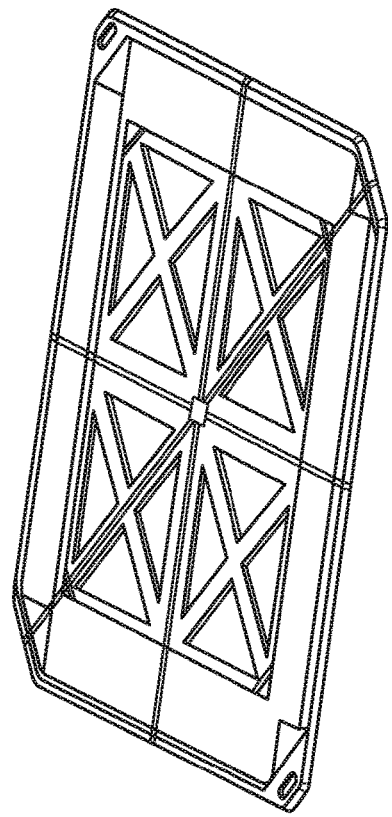
Figure 4C:
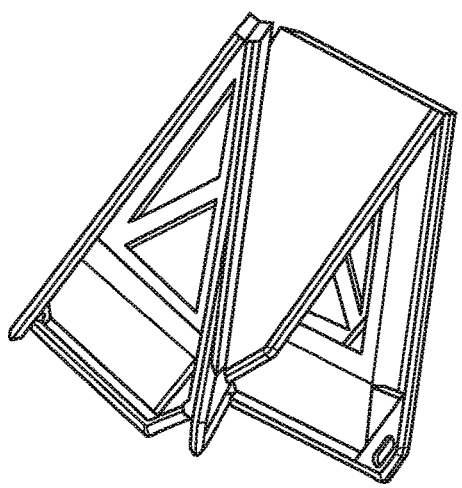
Figure 5:
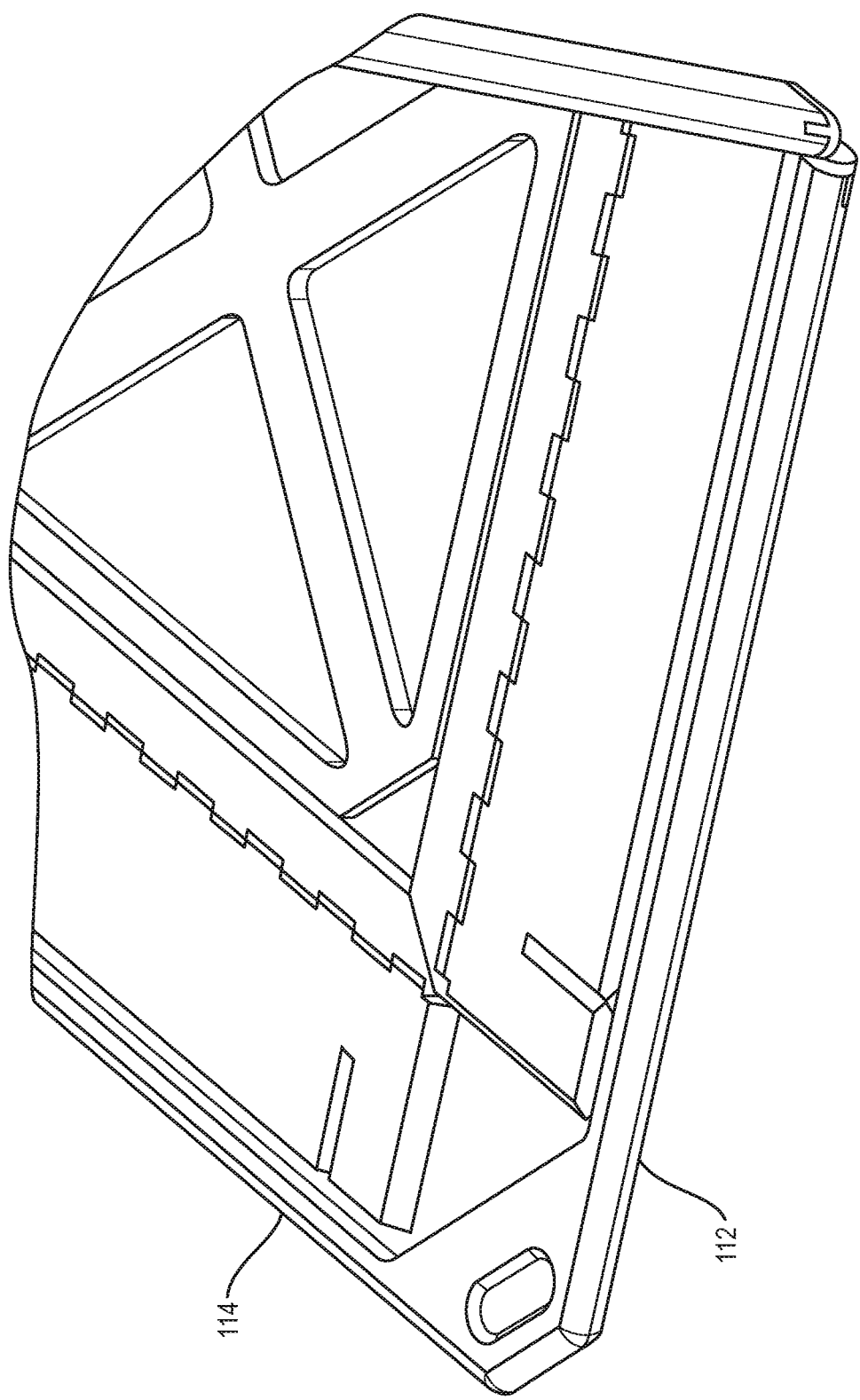
FIG. 5 illustrates the foldable skirt used on the table and Howard stores in a pocket on the underside of the table.

An additional feature of the invention is the inclusion of a pocket 112, FIG. 5 in the tabletop 10 into which a foldable table skirt 114 folds when not in use thus allowing the table top 10 and skirt 114 to be completely folded as shown in FIG. 4D.

Figure 6:
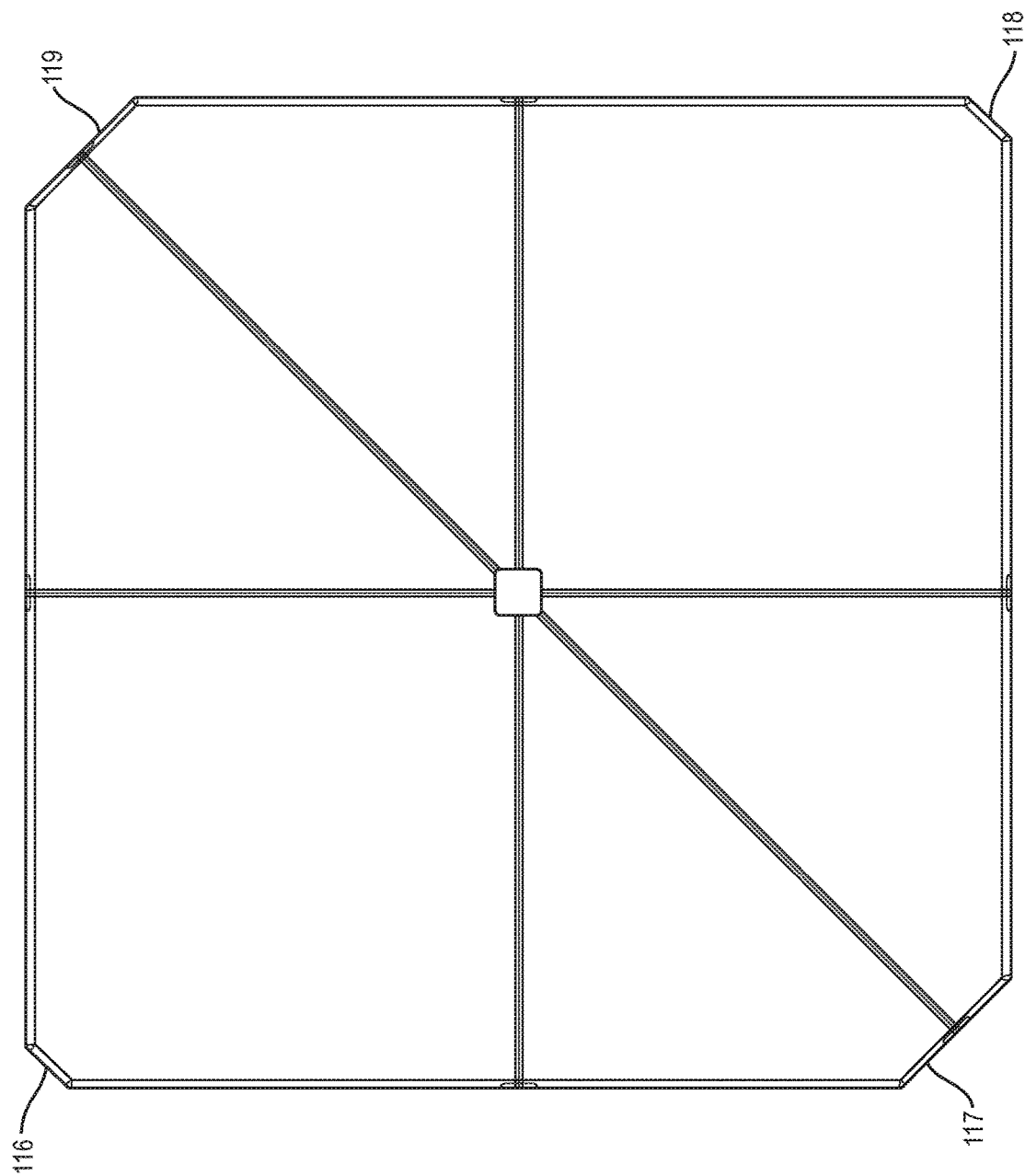
FIG. 6 shows a top view of the tabletop illustrating the different champ for on the corners of the table.
Figure 7:
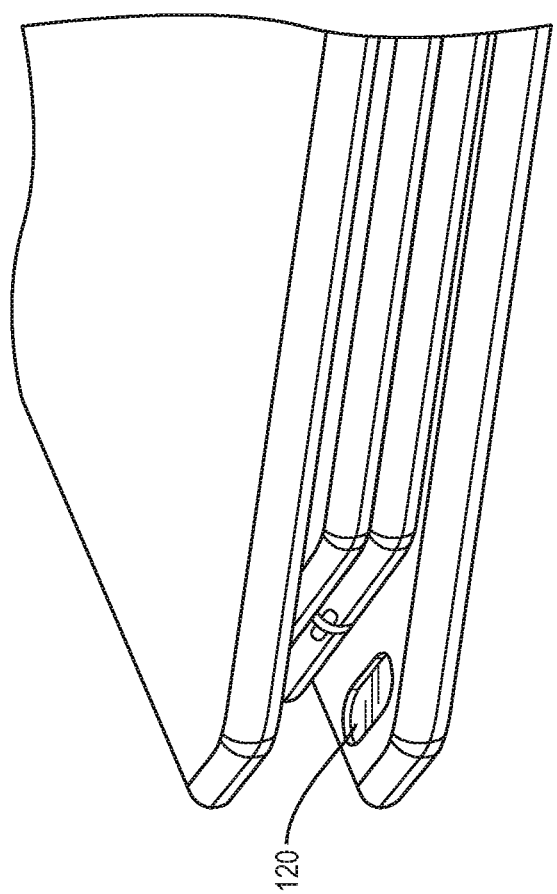
FIG. 7 shows the corners of the table and how the chamfered corners form and allow for access to a finger cut out for carrying purposes.

As shown in greater detail in FIGS. 6 and 7, the corners of the tabletop have a different chamfer as shown in FIG. 6. The corners 116 and 118, having the smaller cut or chamfer 117, 119, provide for the inclusion of a finger cut out region 120 on the bottom side of the table as shown in FIG. 7. This provides a carrying location for the table.

Figure 8:
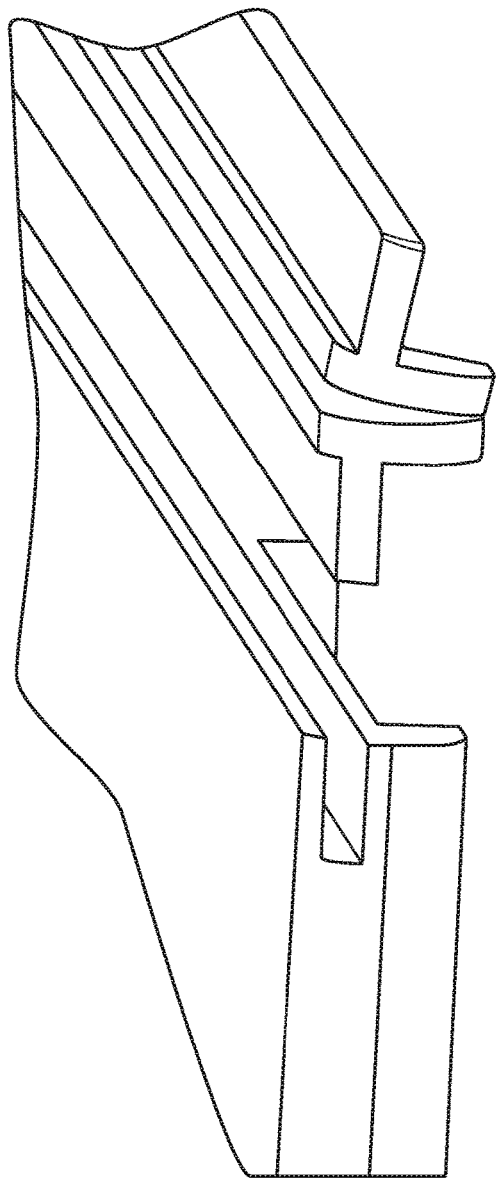
FIGS. 8 and 9 show the construction and installation of the table section hinges.
Figure 9:
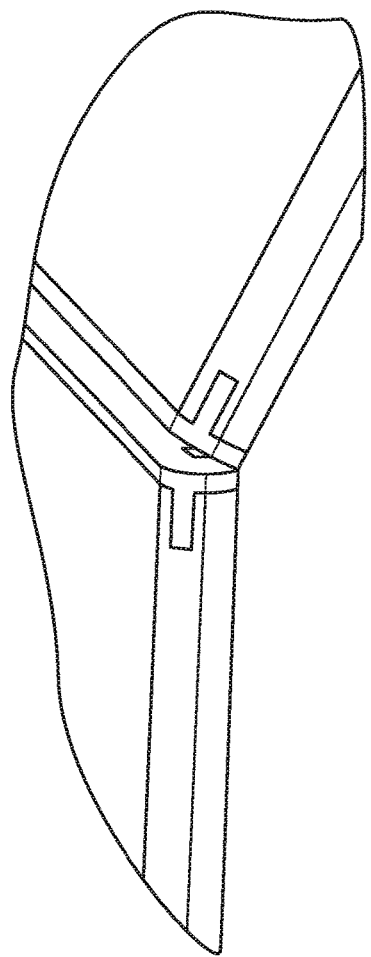
Figure 10:
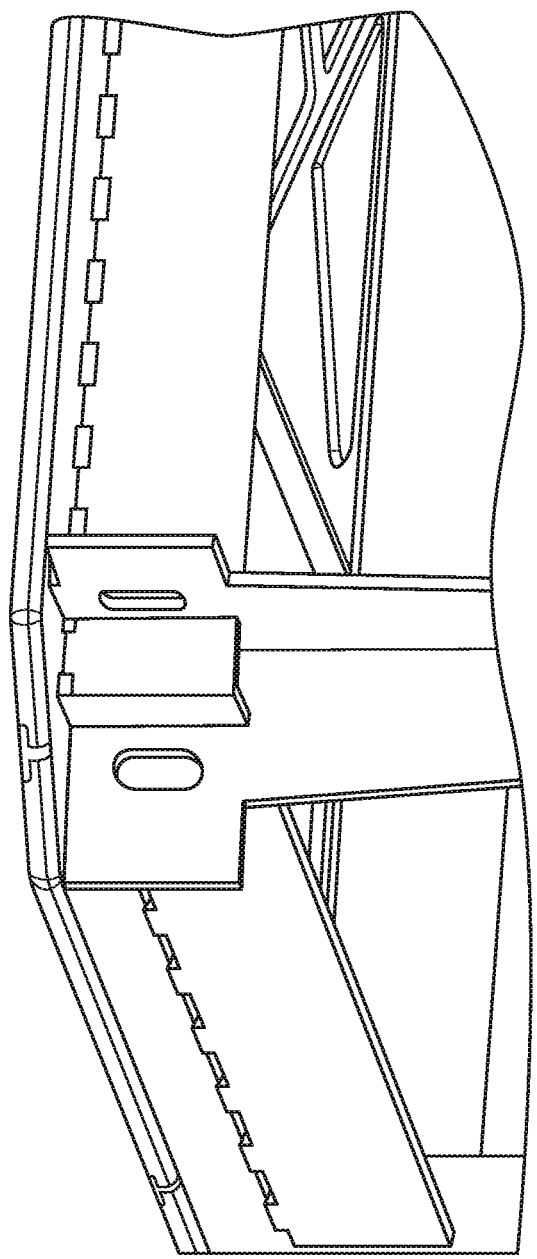
FIG. 10 is a side view of the folding table of FIG. 1 illustrating the interconnection between the foldable legs and the table skirt.
Figure 11A:
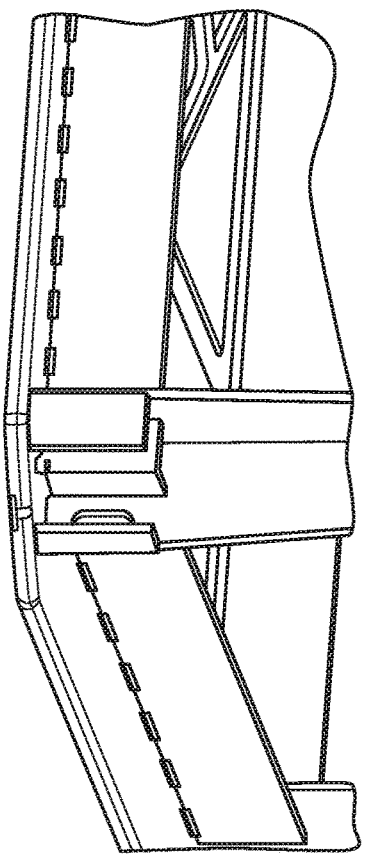
FIGS. 11A-11D are side views illustrating the method of interconnecting the foldable leg with the table skirt according to one feature of the present invention.
Figure 11B:
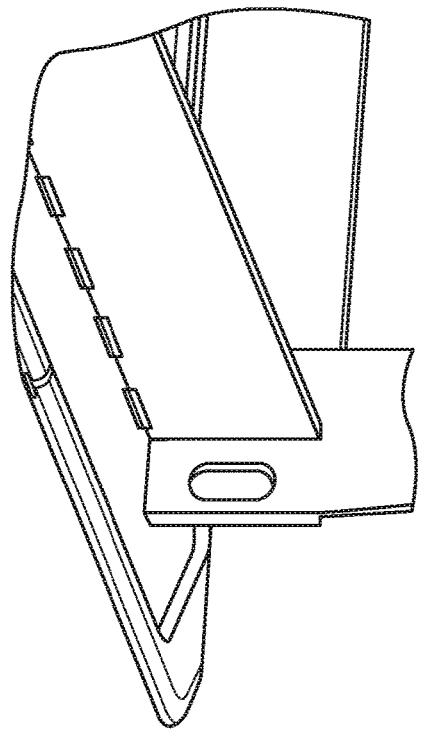
Figure 11C:
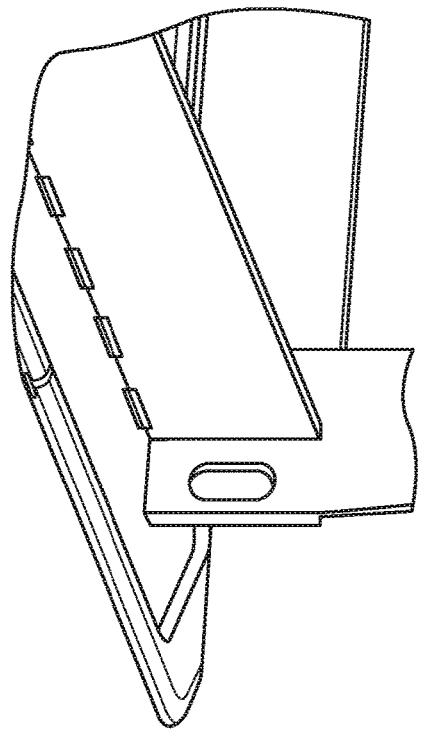
Figure 11D:
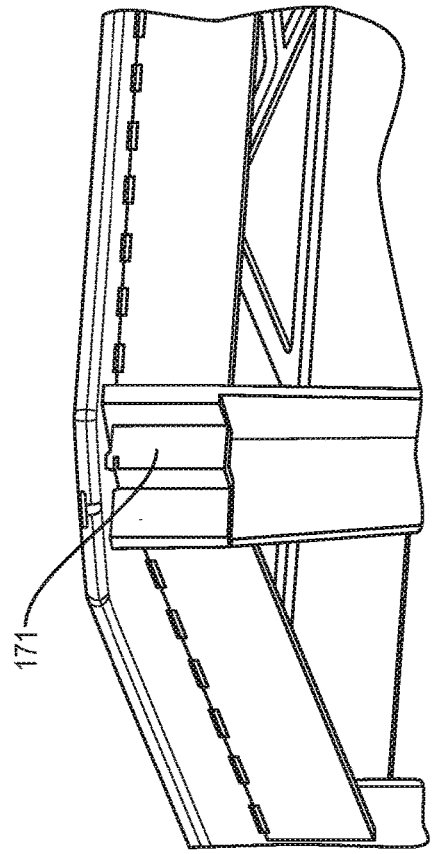

Each of the sections 12 of the tabletop 10 are coupled together by means of a hinge mechanism 14. In one embodiment, the hinge mechanism 14 may be an elongated piano type hinge or elongated live hinge or gear hinge. An example of such an exemplary hinge mechanism is shown in FIGS. 8 and 9.

Alternatively, a T-link style hinge 122 may be utilized for the tabletop. In addition, the T-link hinge may be used for other applications as well and is useful in its own right.

Figure 13:
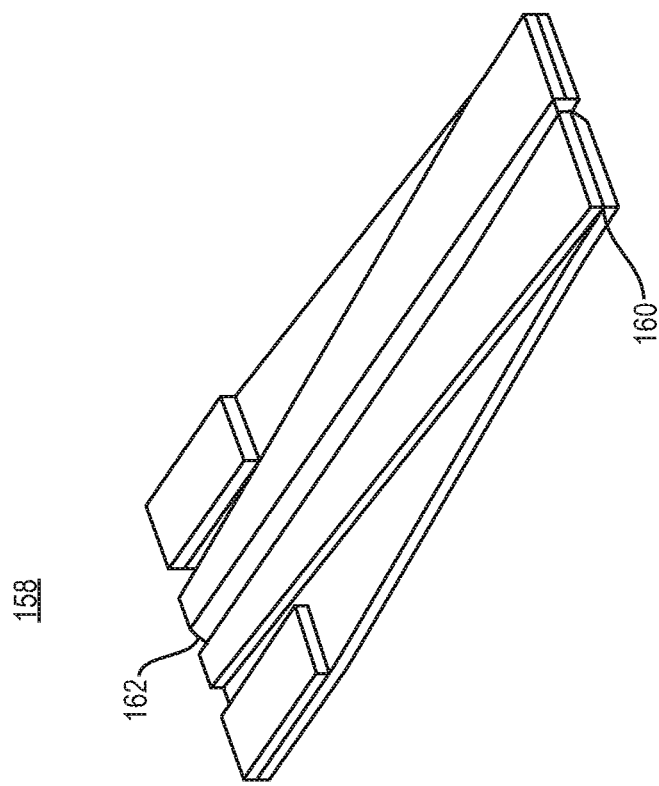
FIGS. 12 and 13 illustrate the method of folding the foldable table legs according to one feature of the present invention.
Figure 12:
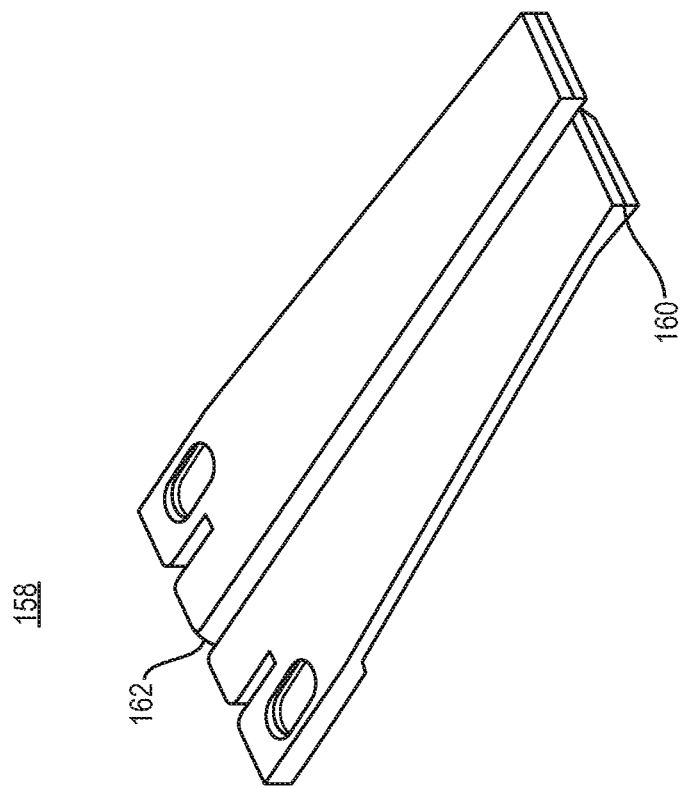
Figure 15:
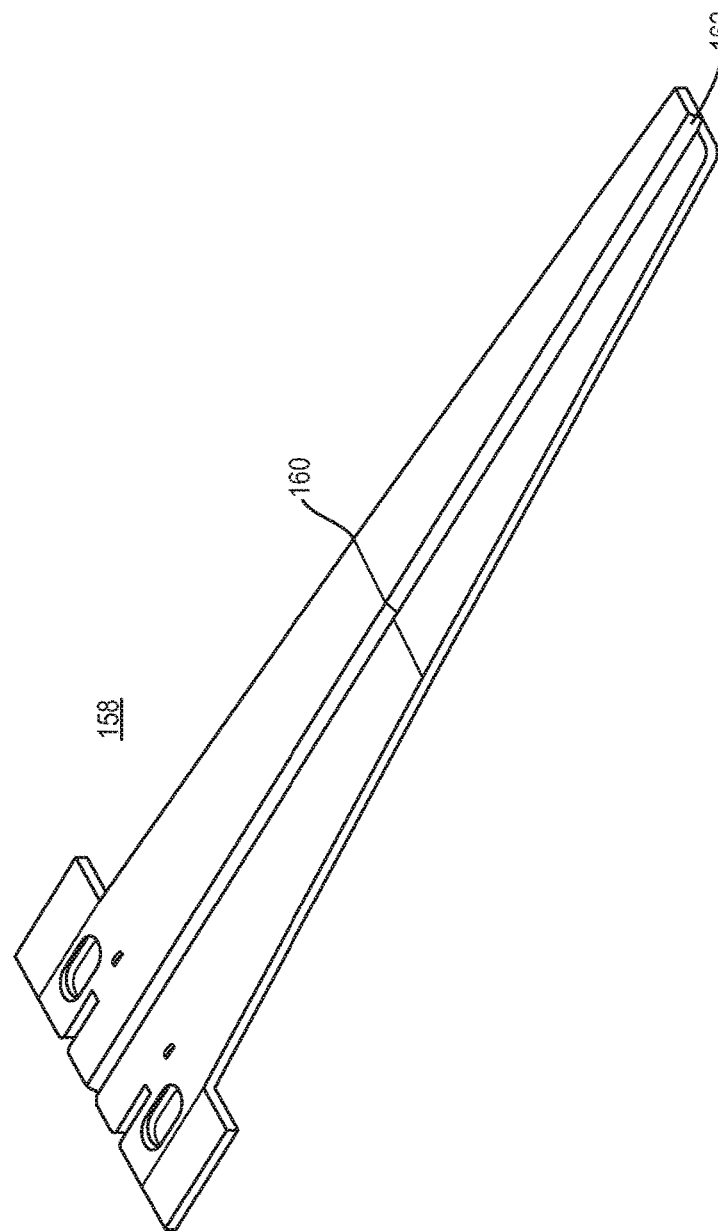
FIGS. 15-17 are detailed views indicating the foldable leg according to one feature of the present invention.
Figure 17:
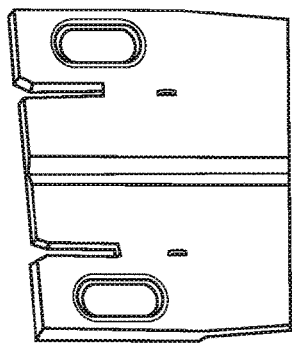
Figure 20:
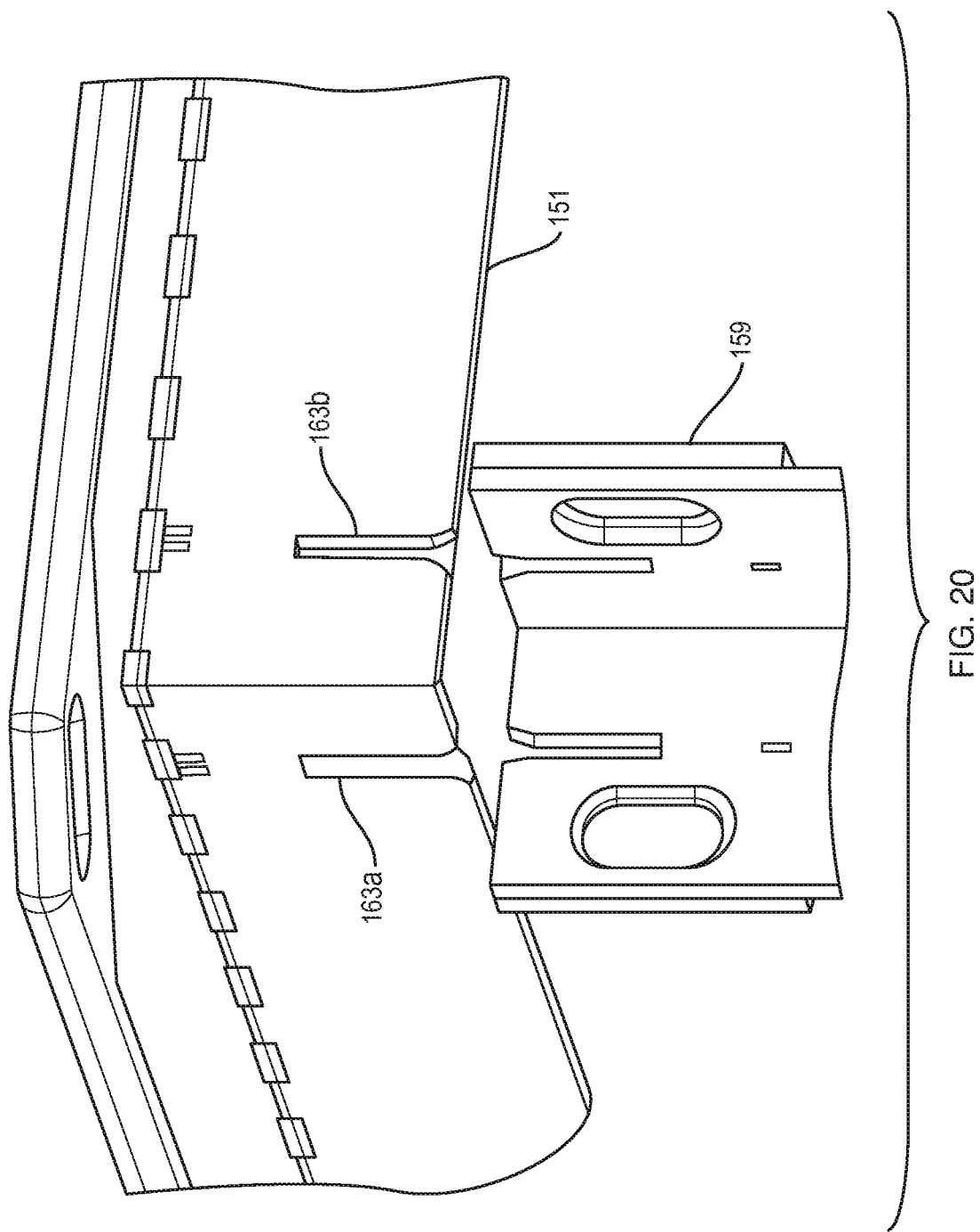
FIGS. 20-22 illustrate the interconnection between the foldable table leg and the foldable table skirt according to one feature of the present invention.
Figure 21:
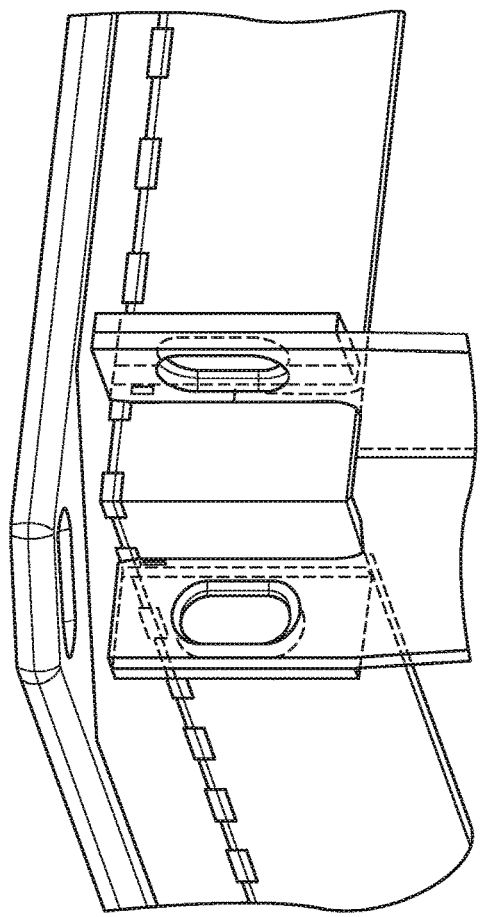

Another feature of the foldable table according to the present invention includes, in yet another embodiment, foldable legs 158, FIG. 15 designed to interconnect with the table skirt. The foldable legs 158 fold lengthwise by virtue of and along fold line 160 as shown in FIGS. 12 and 13, as well as width wise along fold line 162 (not shown folded). The top portion of the leg 159 includes first and second slots 164 which are designed to interconnect with the slots 163a and 163b in the downward folding skirt 151 FIG. 20 of a table 10. The skirt 151 and leg 158 interconnect to create a strong stable table support.

Figure 14:
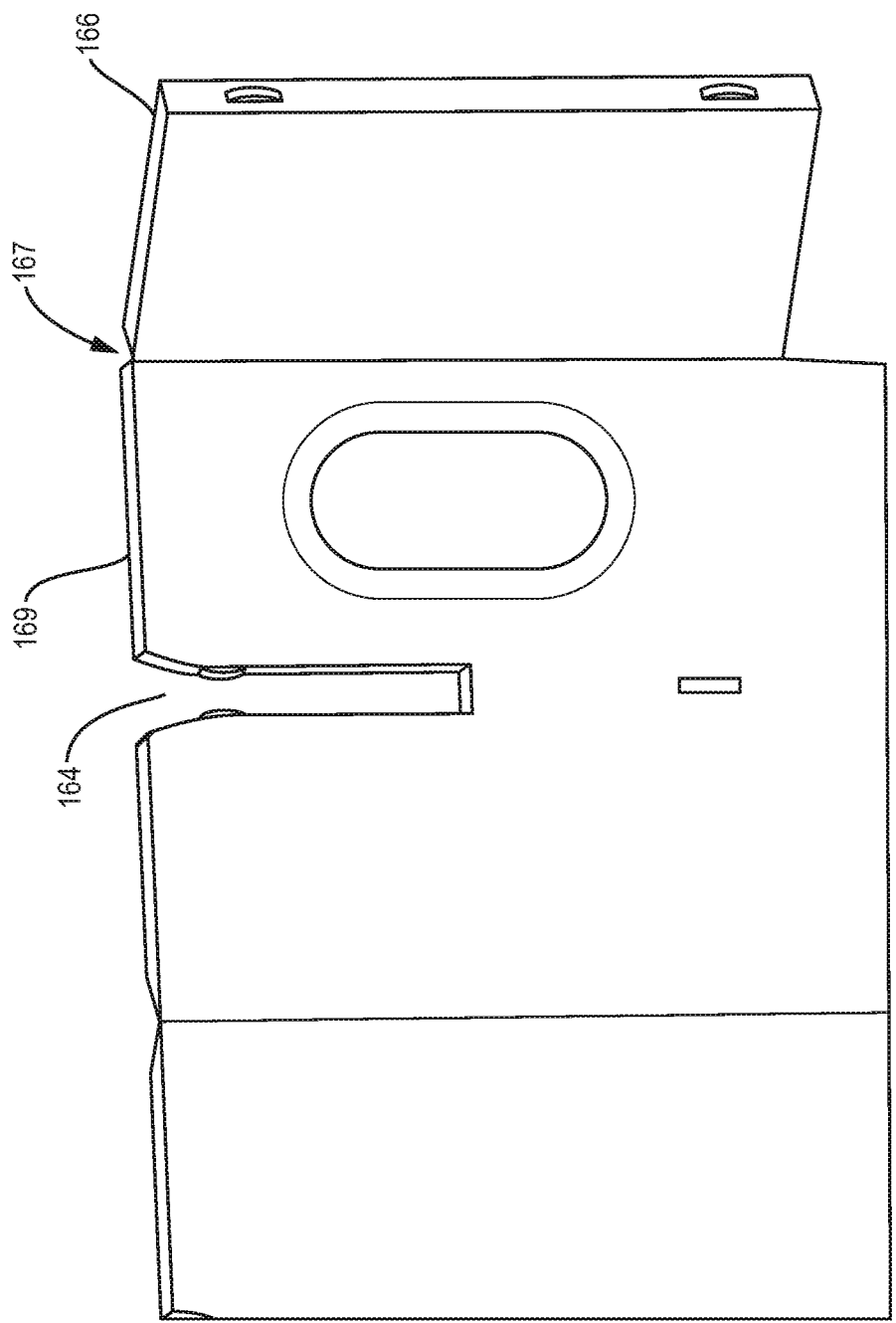
FIG. 14 is a more detailed view of the top portion of the foldable leg according to one feature of the present invention.
Figure 16:
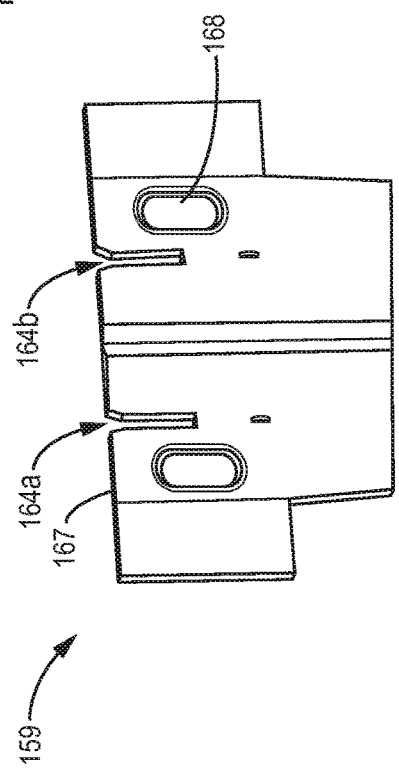
Figure 18:
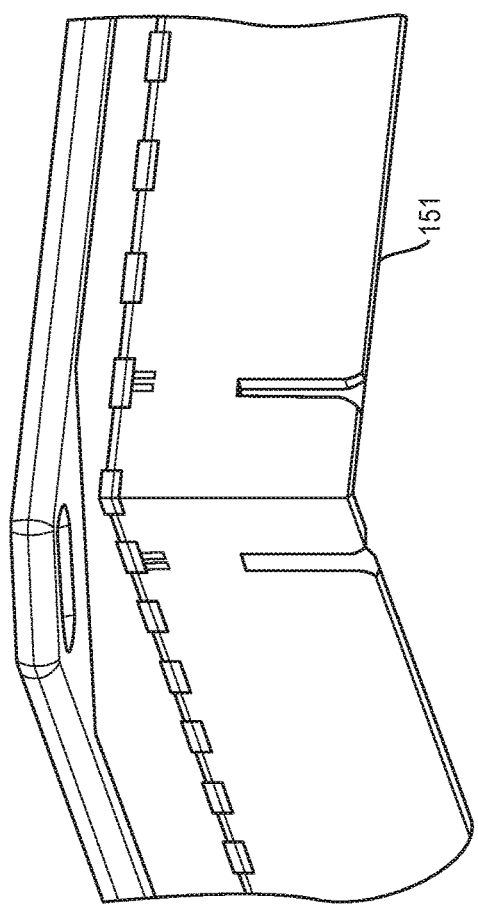
FIGS. 18 and 19 illustrate the table skirt with which the foldable legs according to the present invention interconnect.
Figure 19:
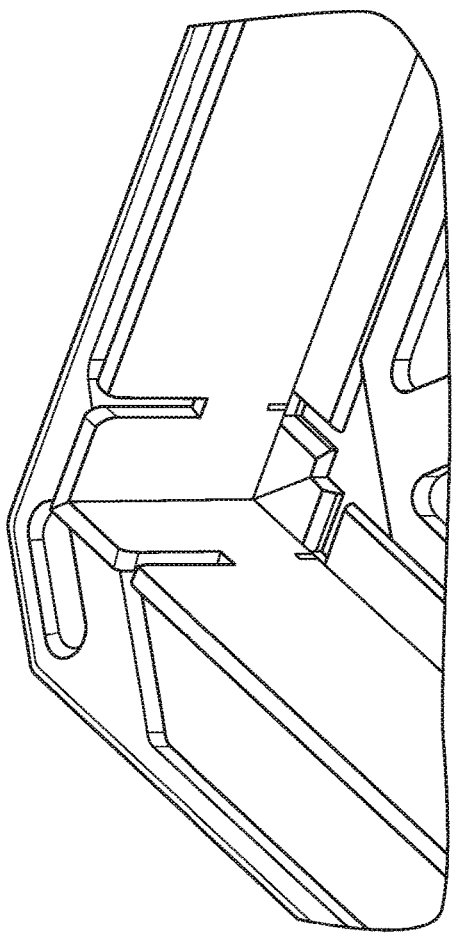
Figure 22:
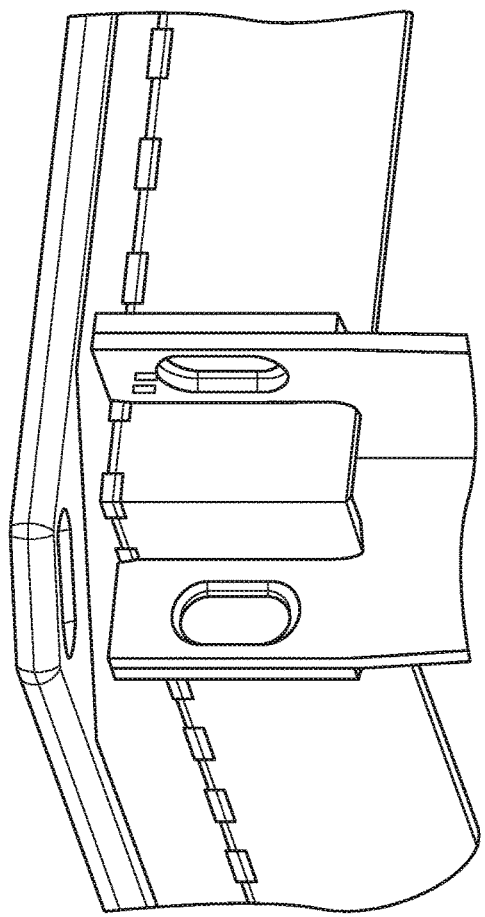

A foldable piece 166 in the leg 158, FIG. 14, includes a live hinge 167 which allows the foldable piece 166 to fold back against the leg portion 169 and against the corner 171 formed by the table skirt as shown in FIGS. 11A-11D. The opening 168, FIG. 16, allows the user to push against the foldable portion 166 to release the foldable leg 158 from interconnection with the table skirt 151. The foldable legs 158 and table skirt 151 are typically made of a plastic type material and may include one or more snaps or protrusions as shown in FIG. 14 which helps keep the legs in place in position against the table corner 171 and the table skirt 151. See FIG. 22 for example. In another embodiment, one or more of the foldable legs 158 and/or table skirt 151 may be made of a reinforced cardboard material, a composite material, metal, wood or any other suitable material.

The table skirt 151 is hinged to the table top 10 using a number of finger hinges, a live hinge or other similar hinge technology which allows it to drop downward from its storage location inside a cut out region 112 in the bottom of the table top 10. The foldable legs 158 may be used not only with the foldable table as described herein but in order to support any type of device or structure having a vertical corner portion with which the foldable legs 158 can removably interconnect.

Accordingly, the present invention provides a foldable table and table legs comprising a tabletop including a plurality of tabletop sections each of which are interconnected by a hinge mechanism allowing the tabletop fold into a small, compact package. Detachable and foldable legs are configured for coupling to a table skirt comprising four segments which fold down from a storage pocket on the underside of the tabletop. The foldable legs interconnect with the table skirt once it is folded down from its storage position. The tabletop and foldable legs may all be folded into a compact, portable and packable configuration.

Modifications and substitutions by one of ordinary skill in the art are considered to be within the scope of the present invention, which is not to be limited except by the following claims.

The invention claimed is:

1. A foldable tabletop and tabletop supporting legs comprising:
    a tabletop comprising a plurality of segments, each of said plurality of segments coupled to an adjacent two of said plurality of segments by a hinge mechanism, said hinge mechanism configured for allowing one or more of said plurality of segments to fold along said hinge mechanism onto an adjacent one of said plurality of segments, said tabletop including a top surface and a bottom surface;
    a tabletop skirt, said tabletop skirt comprising four tabletop skirt sections, said four tabletop skirt sections configured for folding downward from a storage position proximate said bottom surface of said tabletop, said four tabletop skirt sections forming four tabletop skirt corners when in said folded downward position; and
    four table legs, each of said four table legs including a vertical fold mechanism and a horizontal fold mechanism, said horizontal fold mechanism configured for allowing said four table legs to fold in a horizontal direction reducing a non-folded length of each of said four table legs, and said vertical fold mechanism configured for allowing said four table legs to fold in a vertical direction reducing a non-folded width of said table legs.

2. The foldable tabletop and tabletop supporting legs according to claim 1, wherein a plurality of corners of the tabletop include a first pair of diagonally opposite corners and a second pair of diagonally opposite corners, and wherein said first pair of diagonally opposite corners and said second pair of diagonally opposite corners are chamfered.

3. The foldable tabletop and tabletop supporting legs according to claim 2, wherein said first pair of diagonally opposite corners have a smaller chamfer relative to said second pair of diagonally opposite corners.

4. The foldable tabletop and tabletop supporting legs according to claim 3, wherein said second pair of diagonally opposite corners include a finger cut out region, wherein the finger cut out region provides a carrying location for the table.

5. The foldable tabletop and tabletop supporting legs according to claim 1, wherein a top portion of said four table legs includes at least one slot, configured for interconnecting with said downward folded tabletop skirt.

6. The foldable tabletop and tabletop supporting legs according to claim 5, wherein said four table legs include a foldable piece having a live hinge portion, configured for allowing the foldable piece to fold back against a leg portion of said four table legs and against one of said four tabletop skirt corners formed by said tabletop skirt.

7. The foldable tabletop and tabletop supporting legs according to claim 6, wherein said top portion of said four table legs include an opening configured for allowing a user to push against said foldable piece to release the foldable leg from interconnection with the tabletop skirt.

\* \* \* \* \*